United States Patent [19]

deMuy et al.

[11] Patent Number: 5,036,796

[45] Date of Patent: Aug. 6, 1991

[54] SMALL ANIMAL CAGE

[75] Inventors: Lucien deMuy, Quebec; André Moreau, Montreal, both of Canada

[73] Assignee: Monsieur Acier Inoxydable Inc., Laval, Canada

[21] Appl. No.: 440,749

[22] Filed: Nov. 24, 1989

[51] Int. Cl.⁵ .......................................... A01K 31/00
[52] U.S. Cl. ...................................... 119/17; 292/302
[58] Field of Search ................ 119/17, 19; 292/156, 292/161, 162, 163, 302, DIG. 68, DIG. 40, DIG. 56, DIG. 55

[56] References Cited

U.S. PATENT DOCUMENTS

| | | | |
|---|---|---|---|
| 1,961,383 | 6/1934 | Nye et al. | 292/302 |
| 3,244,146 | 4/1966 | Kurtz et al. | 119/17 |
| 3,536,044 | 10/1970 | Stephens et al. | 119/17 |
| 3,651,786 | 3/1972 | Patterson et al. | 119/17 |
| 3,952,703 | 4/1976 | Erfeling | 119/17 |
| 4,570,574 | 2/1986 | Burkholder | 119/17 |
| 4,917,047 | 4/1990 | Wazeter, III | 119/17 |

Primary Examiner—Gene Mancene
Assistant Examiner—R. Thomas Price
Attorney, Agent, or Firm—Pierre Lespérance

[57] ABSTRACT

There is provided a lattice door lock for a small animal cage. The lock includes a vertical tube secured to the cage and a rigid stick slidably mounted into the tube. A latch transversely projects from the stick and hookingly engages the latticed door under the bias of the weight of the stick when the door closes the cage. A lever at the base of the tube and contacting the stick allows an animal caretaker to actuate the lock without requiring use of his hands, wherein his elbow e.g. may be used. Thus, even if he has to use both hands to handle the animal to be caged, the animal caretaker will be able to open the cage door.

13 Claims, 6 Drawing Sheets

SMALL ANIMAL CAGE

FIELD OF THE INVENTION

The invention relates to veterinary clinic accessories, and more particularly cages for temporarily keeping in captivity small animals.

BACKGROUND OF THE INVENTION

In the places where small animals are kept in captivity, and more particularly in veterinary clinics, latticed cages are usually used for these small animals. The cage door or gate must be sturdy while allowing free air circulation therethrough. This door is usually locked with a door lock. When an animal caretaker must carry an animal into such a cage, he must be able to operate the gate almost at the same time as the handling of the animal to be caged, since the latter may becomes restless and thus render the work of the animal caretaker difficult, and even in some instances dangerous. The same problem is apparent when the animal is to be pulled out from the cage: the caretaker often requires both hands to control the animal. Thus, it would be desirable that the gate lock be operatable by means other than the caretaker hands, so as to free them for the restraint of the animal to be caged.

OBJECTS OF THE INVENTION

The prime goal of the present invention is thus to facilitate the work of veterinary sciences specialists who have to cage small animals, by providing a sturdy yet economical cage.

SUMMARY OF THE INVENTION

In view of the above-noted goal, there is provided the combination of a vertical open frame defining two opposite vertical sides and two upper and lower edges, a pivot member mounted on one of said sides, a gate consisting of spaced horizontal and vertical stems and carried by the frame in a vertical plane by said pivotal member which enables its pivotal motion about a vertical axis between a closed position and an open position, and a lock mounted on the other of said sides for releasably retaining the gate in closed position i.e. substantially coplanar to said frame; wherein said lock comprises: retaining means about said other side of the frame, a stick slidably mounted to said other side of the frame thanks to said retaining means between two upper and lower limit positions, a grabbing member being secured to said stick and capable of grabbing one of said horizontal stems of the gate once the latter is closed, said grabbing member being actuated by the vertical sliding of said stick, and control means for sliding said stick and thus actuating said grabbing member, and wherein said control means may be actuated by coarse means such as with the elbow or the knee.

Preferably, said gate comprises spring means for biasing same in its open position. Also preferably, locking means are provided for locking the gate lock in closed position. Advantageously, said grabbing member is a latch defined by a plate, with a rounded cavity on its lower face, said one horizontal stem releasably engaging said rounded cavity under the weight of said stick when said gate is in closed position in order to retain said gate in closed position. Preferably, the inner face of said latch is downwardly outwardly curved relative to the adjacent side of the frame, so that, once the gate has been brought to its closed position after having pivoted from its open position to its closed position, the latch, striking said inner curved face of said one horizontal stem, will lift under impact and will subsequently come to engage on said one horizontal stem under the weight of said stick. In this latter case, it is envisioned that said gate lock further includes: another cavity, made in the upper section of said stick, a second horizontal stem destined to register with said another cavity when said stick is at said upper limit position and to extend through said cavity, so as to permit the opening or the closure of the gate concurrently with the motion of said latch.

Preferably, said control means includes a lever, pivotally mounted at its intermediate section to the base of said frame; said lever comprising two legs the upper one of which will slide under said stick to lift same when the lever is pivoted, and the lower one of which downwardly forwardly projects when the stick is at said lower limit position but downwardly and rearwardly when the stick is at its upper limit position.

Preferably, the two legs of said lever define therebetween an obtuse angle of between 110° and 140°.

Advantageously, said locking means includes a padlock, a plate transversely secured on one side to said frame in register with said latch, this plate and this latch each having a bore registering with each other when the stick is at said lower limit position to be engaged by said padlock.

Preferably, said frame is the front wall of a small animal cage, said retaining means is a tubular member secured in vertical position on said other side of the frame and into which said stick may slide, the upper section of said stick projecting beyond said tubular member when the stick is in its said upper limit position, an aperture being made in the inner wall of said tubular member to receive said latch and to enable its vertical play once the stick is sliding. In this latter embodiment, it is envisioned that said sides of said frame each comprises a flange respectively outwardly, rearwardly and inwardly elbowed three times at right angle; several such cages being positioned side by side as well as superimposed one over the others; a rigid, elongated, cross-sectionally flattened C-shape connector vertically joining the free rearward section of said elbowed flange of the superimposed pairs of transversely adjacent frames, to releasably interconnect said cages. Preferably, stick guiding means are provided to facilitate the sliding motion of the stick within said tubular member.

In an alternate embodiment of the invention, there is disclosed the combination of the frame defining a large aperture, a first frame section comprising a pivotal member, a gate being carried by the frame through said pivotal member which enables its pivotal motion between a closed position, within a plane slightly outwardly of and parallel to said aperture, and an open position clearing said aperture, and a gate lock mounted to a second section of said frame opposite said first section thereof to releasably retain the gate in closed position; wherein said lock comprises: gate retaining means about said second frame section, a stick mounted substantially vertically slidable on said second frame section thanks to said retaining means between two upper and lower limit positions, a grabbing member being secured to said stick and destined to grab and to maintain in closed condition said gate under the bias of the weight of the stick once the gate is in closed position, said grabbing member being actuated by the downward sliding of said stick, and control means for opening the gate by lifting said stick and thus by disengaging said grabbing member, and wherein said control member may be actuated by a person without having to use his hands.

In still another embodiment of the invention, there is disclosed a cage for small animals, comprising: a flooring supporting two side partitions and a rear partition, and a cover integral to the side and rear partitions; a large front aperture being defined between the front edges of the side walls, of the flooring and of the cover; a door or gate pivotally mounted to the front edge of a first side wall by a pivotal member enabling gate pivotal motion about an axis parallel to but forwardly of the plane of said aperture; a hook member, mounted to said gate at the opposite end of said pivotal member; a lock, mounted to the edge of the second side wall and destined to grab said hook member when the gate becomes substantially parallel to said aperture; simplified lock control means, for enabling a person to unlock the lock without having to use his hands; and biasing means, to bias the closed gate to open once the gate lock is unlocked.

In such a latter embodiment, said pivotal member preferably includes two spaced plates transversely integral to the front edge of said first side wall, these plates being bored so as to pivotally receive a first stem substantially vertical and integral to the door; said biasing means comprising a spacer block, projecting from said front edge of said first side wall, between the plates, and defining the front face of a seat, and a second normally straight stem, substantially horizontal and integral to the door and destined to register with said spacer block, said second stem being rigid but resilient so as to return to its straight condition following bending force thereon, the thickness of said spacer block being such that a twisting moment at the level of said second stem is induced by the abutment of said seat against an inner section of said second stem, when the gate nears its closed position and this twisting moment increases at least up to the time when the gate becomes parallel to the plane of said cage aperture.

Also preferably, said latter gate lock comprises an elongated casing, anchored in vertical position to the front edge of said second side wall, a stick slidable in said casing between two limit positions, and a latch, transversely mounted on said stick and extending through a slit in said casing and destined to engage said hook member under the bias of the weight of the stick when the gate is parallel to said cage aperture; said stick being sensitive to said gate lock control means which is able to lift same.

Preferably, there is further included in the last embodiment releasable frictional lock means for frictionally locking said stick to said casing, said means destined to temporarily disengage said gate lock control means.

Advantageously, said latter hook member is an elbowed cross-sectionally circular arm, integral to the gate and forwardly projecting from its plane, said latch comprising a lower face defining: an upper and inner horizontal wall, a flat outer wall which is upwardly forwardly bevelled, and a vertical wall between the two first-mentioned walls; said latch facilitating the automatic engagement of said gate lock to close the gate, simply by forcibly pivoting the gate towards its closed position, under the impact of said elbowed arm against said bevelled latch wall to lift said stick, as well as the subsequent locking of said cross-sectionally circular elbowed arm between said horizontal and vertical walls of the latch and the section in register with said casing.

It is envisioned that this latter embodiment be considered in combination with other cages identical to the first-mentioned cage, whose side walls, rear wall, flooring and cover comprise rails that outwardly project from the cage; said other cages being destined to be positioned on the side, the top, the underface and the rear of the first-mentioned cage so that the pair of rails of two adjacent cages come in respective register; and further comprising brackets, each able to slidingly and releasably interconnect one said pair of rails, so as to constitute a wall assembly of interconnected cages.

BRIEF DESCRIPTION OF THE DRAWINGS

FIG. 2, under FIG. 1, is a view at an enlarged scale of the area circumscribed by the circle numeral 2 of FIG. 1, showing the hinge of the cage gate;

FIG. 3 is a cross-sectional view of one side of the cage front gate, taken along lines 3—3 of FIG. 2, showing the bracket for transversely securing the cages;

FIG. 8 is a side elevational view of the door lock engagement latch, suggesting how a horizontal stem from the latticed cage gate will engage the latch once the gate is brought to its closed position;

DETAILED DESCRIPTION OF THE INVENTION

Figure 1:
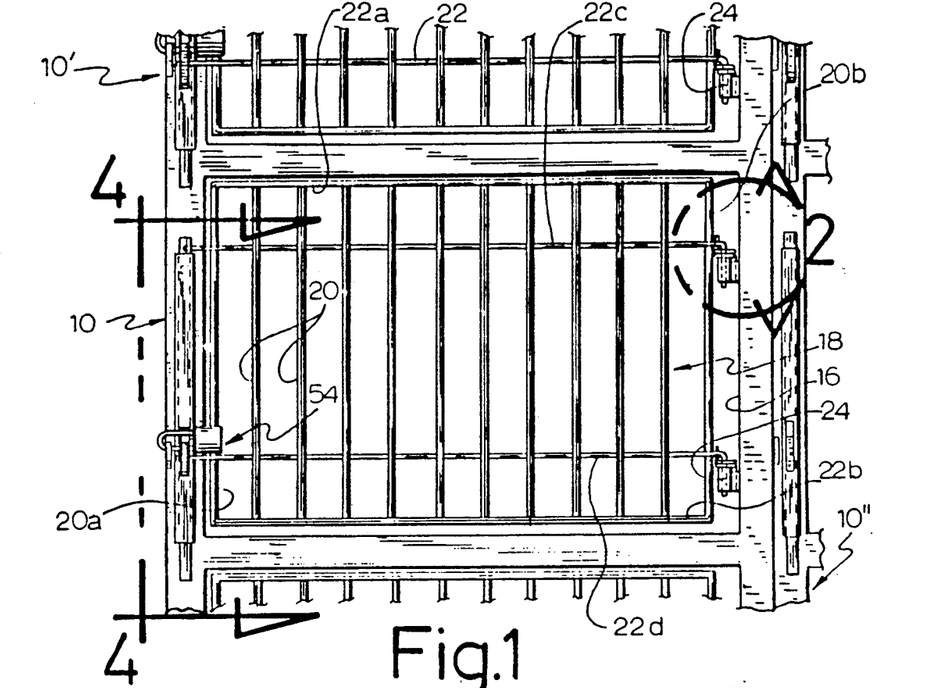
FIG. 1 is a partially broken, front elevational view of an assembly of superimposed cages for small animals.

FIG. 1 suggests a series of superimposed transverse integral cages 10 for use with small animals to be caged by a caretaker or other person. Each cage usually includes two side walls 12, 14, a rear wall as well as upper and lower walls (not shown) which walls may be respectively the lower and upper walls or partitions of other cages 10' and 10" upwardly and downwardly of cage 10. The front opening 16 of the cage 10, usually quadrangular, may be closed by a gate 18 pivotally mounted to the front edge of one of the side walls 14 of the cage 10. The walls, partitions and gates of the cages are latticed or barred, so as to facilitate cage ventilation.

Figures 2, 3:
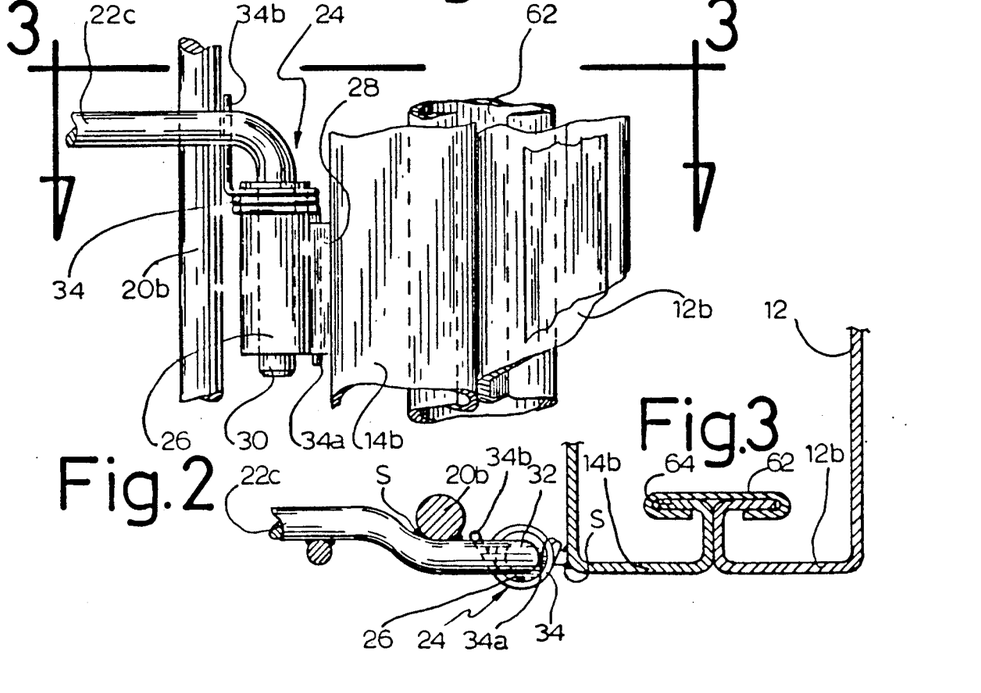

More particularly, gate 18 is consists of a plurality of vertical, spaced, metallic rods 20 which are welded at S, so as to form a quadrangular assembly 20a, 22a, 20b, 22b. It is shown in FIG. 2 how the gate 18 is pivotally mounted to the cage by vertically superimposed spaced hinges 24. Each hinge 24 consists of a metallic cylindrical body 26, maintained in vertical position by an anchoring flange 28 secured by welding S or otherwise to the inner foremost face 14a, of the cage inner wall 14. An end section downwardly curved at 90° from an intermediate horizontal rod 22c (22d), at 30, engages the boring 32 of the cylindrical body 26 of each hinge 24, so as to support a gate 18 in a vertical plane and to facilitate its pivotal motion about a vertical axis. The gate 18 is destined to outwardly open relative to the opening 16 of the cage.

Advantageously, a metallic coil spring 34 is provided, coiled around the cylindrical body 26. The free, vertical, lower, elbowed end 34a of spring 34 abuts against the rod 22c (movable with the gate or door) near the bar 20b at the crossing point thereof, whereas the free, vertical, upper, elbowed end 34b abuts against the fixed flange 28. The metallic spring tension is calibrated to bias the gate 18 to pivot to its open position i.e. that the door opening happens automatically i.e. that the gate is normally open. However, the animals recently caged are usually quite restless, the more so if they come from the wild, and therefore there must be provided a lock 36, to maintain the gate closed.

Figures 4, 5, 6, 7:
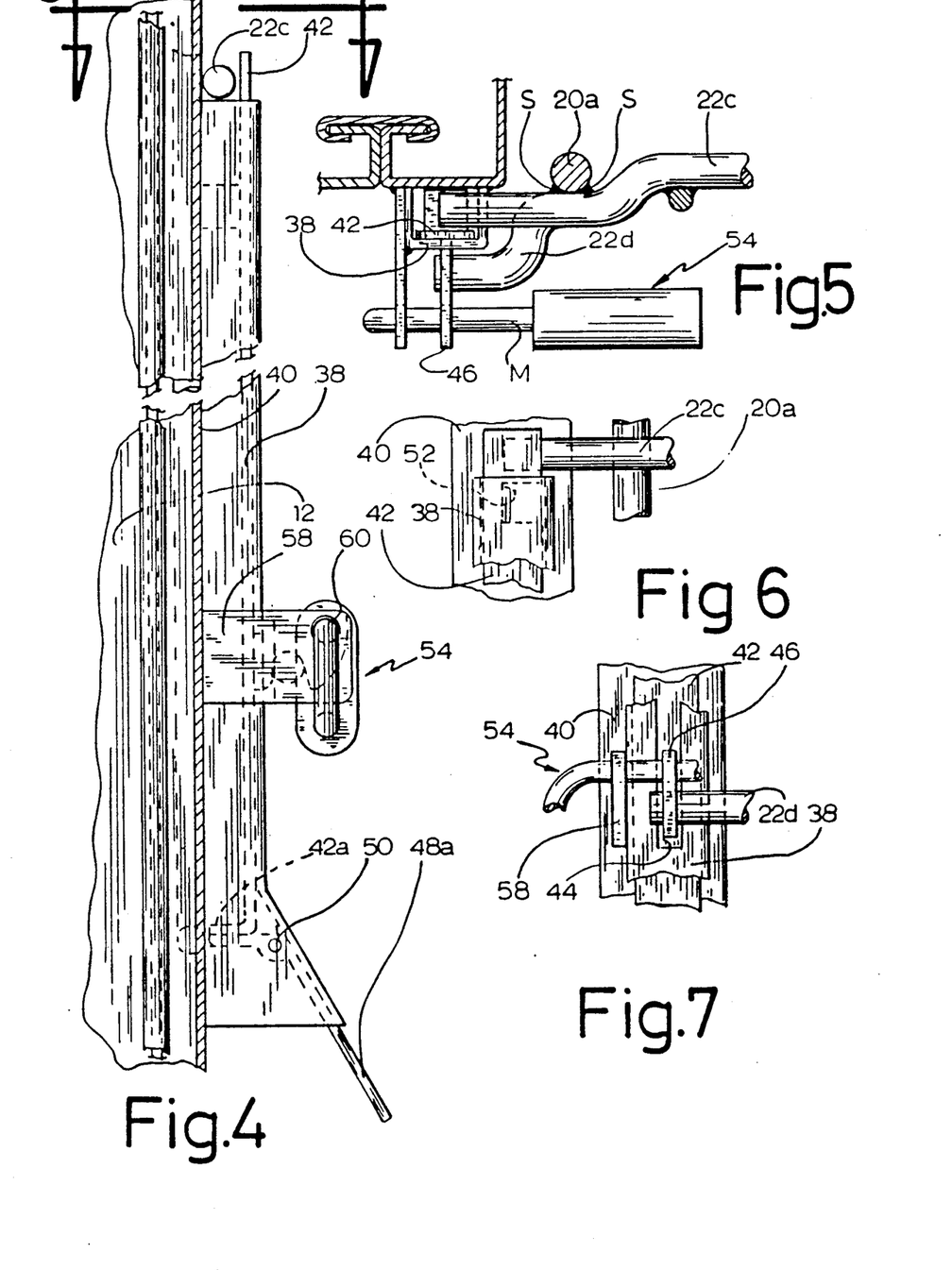
FIG. 4 is a partly broken, sectional, side elevational view, of the front portion of a cage, taken along lines 4—4 of FIG. 1, and by which a cage door lock is seen in closed condition.
FIG. 5, on the second sheet of drawings, is a cross-sectional view taken along lines 5—5 of FIG. 4, showing the padlock and the upper section of the gate door.
FIG. 6, and FIG. 6a on the third sheet of drawings, are front elevational views, at an enlarged scale, of the upper section of the cage gate lock, respectively in closed and opened positions.
FIG. 7, on the second sheet of drawings, and FIG. 7a on the third sheet of drawings, show front elevational views at an enlarged scale of the lock in register with the gate door engagement latch, respectively in closed position (with a padlock shown broken) and in open position.
Figure 4A:
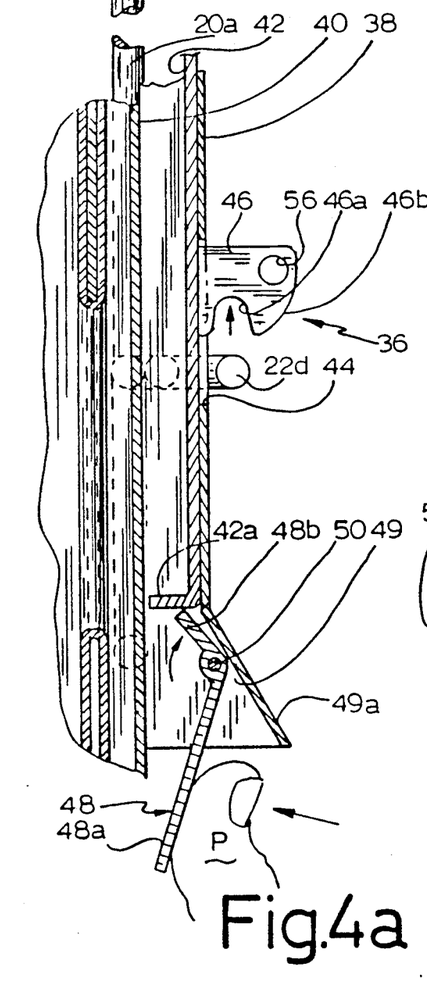
FIG. 4a, on the third sheet of drawings, is a view similar to that of FIG. 4, but completely in section and showing a lock in open position.

The lock 36 is shown in FIGS. 4-4a. It includes a hollow, elongated, cross-sectionally square tube 38, being integral in vertical position to the front outwardly elbowed flange 40, of the cage side wall 12, i.e. on the opposite side of hinges 24. The tube is open at both ends. An elongated metallic stem 42 is slidably mounted in the hollow tube 38. An aperture 44 is made in the intermediate section of the front wall of tube 38. A latch 46 transversely secured to the stick 42 projects through this aperture 44. The latch 46 is at least two times shorter than aperture 44, which allows for a limited vertical play of the latch within aperture 44, i.e. a sliding motion of the stick 42 into the tube 38. Thus, the stick 42 is retained in the metallic tube 38 but may be slidable therein between two limit positions. The latch 46 includes at its lower face a semi-circular cavity 46a destined to engage the end of horizontal stem 22d which comes in register therewith when the gate 18 is closed. The latch remains in position onto the stem 22d under the sole weight of the stick 42, so that the gate cannot be opened from the cage interior.

Obviously, for the latch 46 to maintain the gate closed in an effective fashion, the radius of curvature of the cavity 46a should be greater than the radius of the gate stem 22d.

A control lever 48 for the upward thrust of latch 46 is mounted forwardly of an enlarged section 49 of the lower section of tube 38. This lever 48 is carried by a horizontal pivotal axis 50 parallel to the plane of the frontward cage opening, which pivotal axis is frontwardly of the level of stick 42. This lever 48 comprises a main lower arm 48a, and an upper short leg 48b with the pivotal axis 50 therebetween, the legs forming an obtuse angle therebetween, e.g. 125°. The arm 48a downwardly projects outwardly from the tube 38. The 90° rearward bending of the lower end section 42a of the stick 42 defines an abutment wall against which the leg 48b of the lever 48 may slide when the animal caretaker pivots the lever by rearwardly pushing e.g. with his thumb P (or with his elbow, . . . ) the lower arm 48a of the front lever; the pivotal axis 50 being at forward level relative to the stick 42, the latter will thereafter lift, and the latch will then eventually release the horizontal stem 22d of the gate 18. The biasing spring 34 proximate the hinge will then compel the gate to open.

It is to be noted that the tube 38 stops short of the stem 22c whereas the stick 42 projects beyond stem 22c.

Figures 7A, 8:
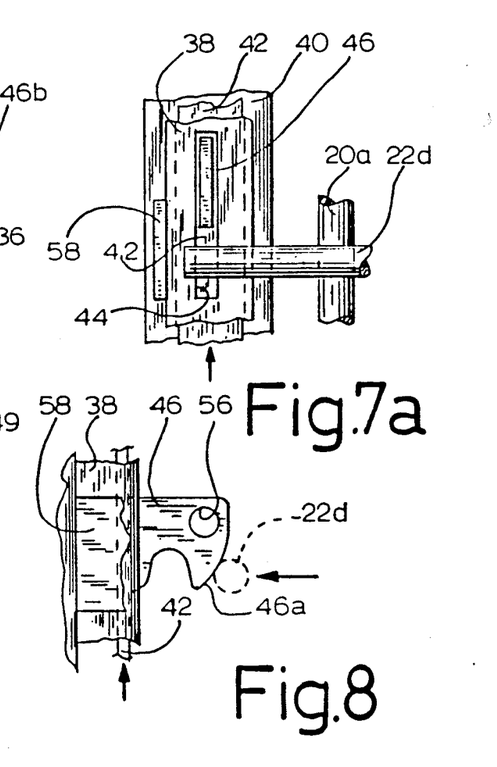

The advantages of such a device are:

(1) the ease of operation of the lock control lever; the lever arm 48a which opens the cage gate may be pushed by a forearm, a knee, etc. . . . of an animal caretaker which would already have his two hands full to restrain the animal to be caged;

(2) the automatic opening of the gate, under the bias of the hinge coil springs;

(3) the automatic latching of the lock onto the horizontal stem of the gate, when the animal caretaker closes the gate on the caged animal: see FIG. 8, where the stem 22d compels the latch 46 to temporarily lift because of the forward curvature 46b of the latch, then to slide down in position against the stem 22d, under the weight bias of the stick 42;

(4) it is practically impossible for the caged animal to reach the control lever, since the projecting portion of the arm 48a will positively be under the level of the cage flooring and downwardly forwardly inclined as shown in FIG. 4. Also, the enlarged, forward, downwardly forwardly inclined flange 49a of the lower section of tube 38 constitutes a supplemental deterrence for the caged animal which would like to try to reach the lever 48 by extending one leg through the closed latticed gate.

Figure 6A:
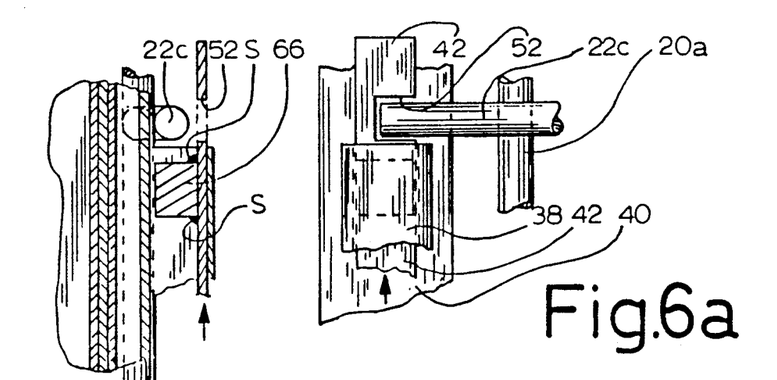

It is envisioned that, in the case particularly of caged primates, the gate could open if the caged animal forcibly strikes the gate so as to sufficiently shake the latch so that the latter would lift. This is why a supplemental lock means is provided. This means comprises a transverse cavity 52 (see FIG. 6a) made in the inner upper section of the vertical stick 42. This cavity 52 is destined to become transversely engaged by the stem 22c when the stick 42 is lifted by the lever 48. The height of the cavity 52 is only slightly larger than the diameter of the stem 22c, whereby both should exactly register with each other for the free end of the stem 22c to extend through the cavity 52 and thus for the gate to open. As illustrated in FIG. 4, the latch 46 is then spaced by a given height from the stem 22d, which should then contribute to a heightened safety level for the lock (reducing the probabilities of accidental unlocking).

It is also envisioned to lock the latch 46 in position onto the stem 22d of the gate 18, by a padlock 54, e.g. during the night or when the public is allowed to visit the cage room. It is then envisioned to bore a hole 56 into the latch, and to add a rectangular plate 58 transversely exteriorly of the tube 38 and welded thereto in S, in register with the latch 46 and parallel thereto. A hole 60 similar to hole 56 is made in the plate 58. The holes 56 and 60 are coaxial when the latch 42 lays on the stem 22d. When the padlock 54 engages the latch 46 and the plate 58 through their holes, and when it is locked, the gate 18 becomes integral to the cage 10.

Advantageously, the cages 10 which are transversely registering are releasably secured by a vertically slidable bracket 62, illustrated in FIGS. 2 and 3. Each bracket 62 may interconnect several pairs of superimposed cages. The brackets are of flattened C-shape in cross-section, and slidably engage the opposite coplanar flanges 64 of the outer forward edge 12b or 14b of the side walls 12 or 14 of the cage, the flanges 64 being parallel and spaced from their outer flanges 12b or 14b.

A guiding block 66 is advantageously welded to the stick 42 proximate its upper end, so as to maintain the stick against the inner wall of the tube 38, when it vertically slides, to facilitate its displacement.

Figure 9:
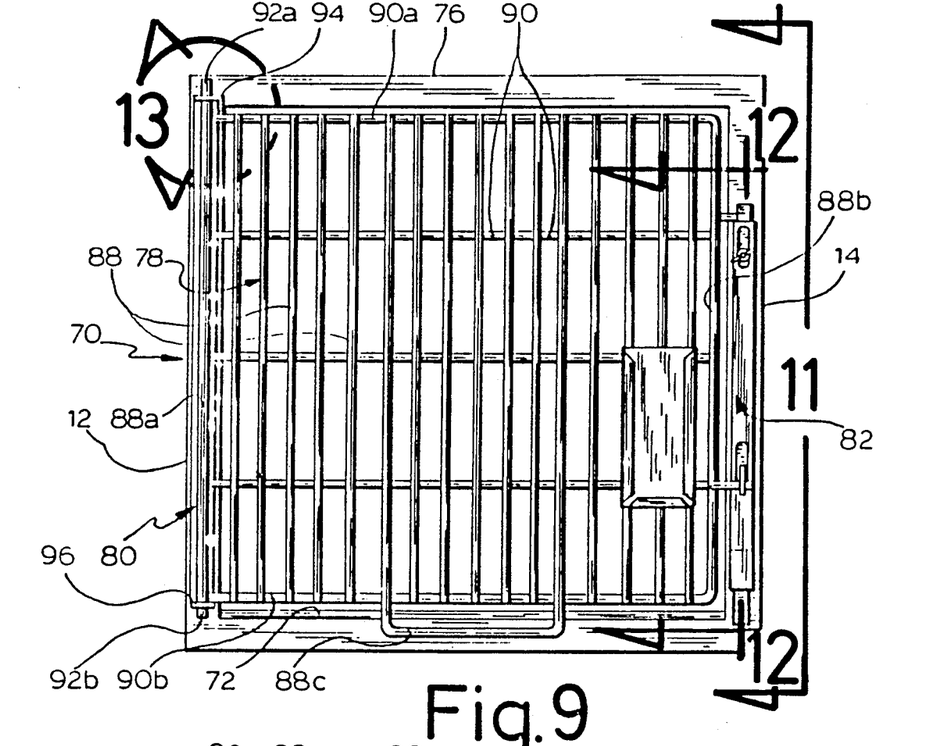
FIG. 9 shows a side elevational view of a second embodiment of cage according to the invention.
Figure 10:
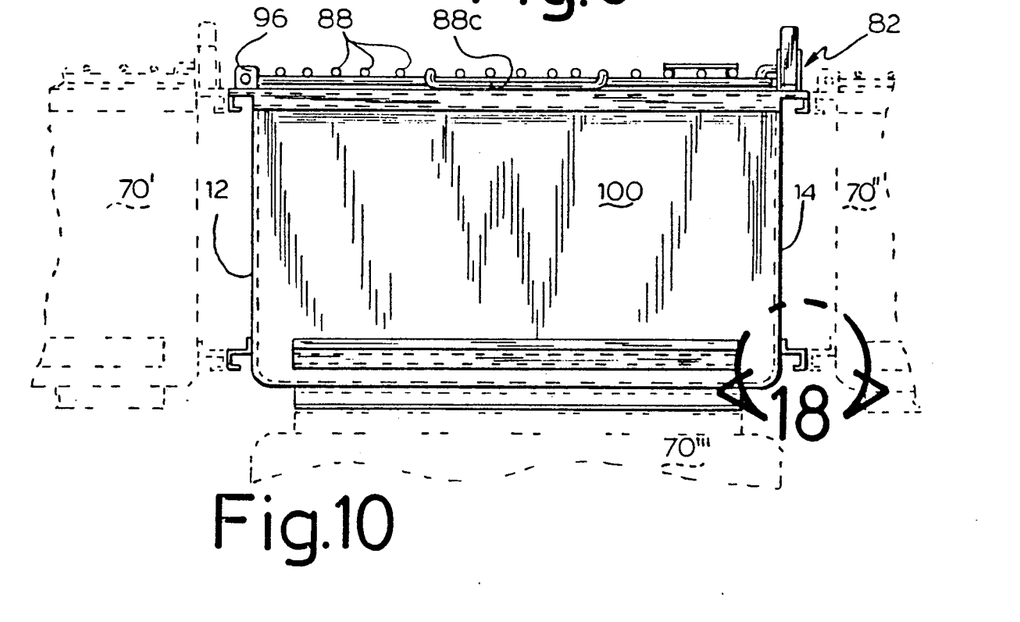
FIG. 10 shows a plan view of the underface of the second embodiment of cage according to the invention, which is destined to be removably secured at its two side wall and at its rear wall by three similar cages shown in phantom lines.
Figure 11:
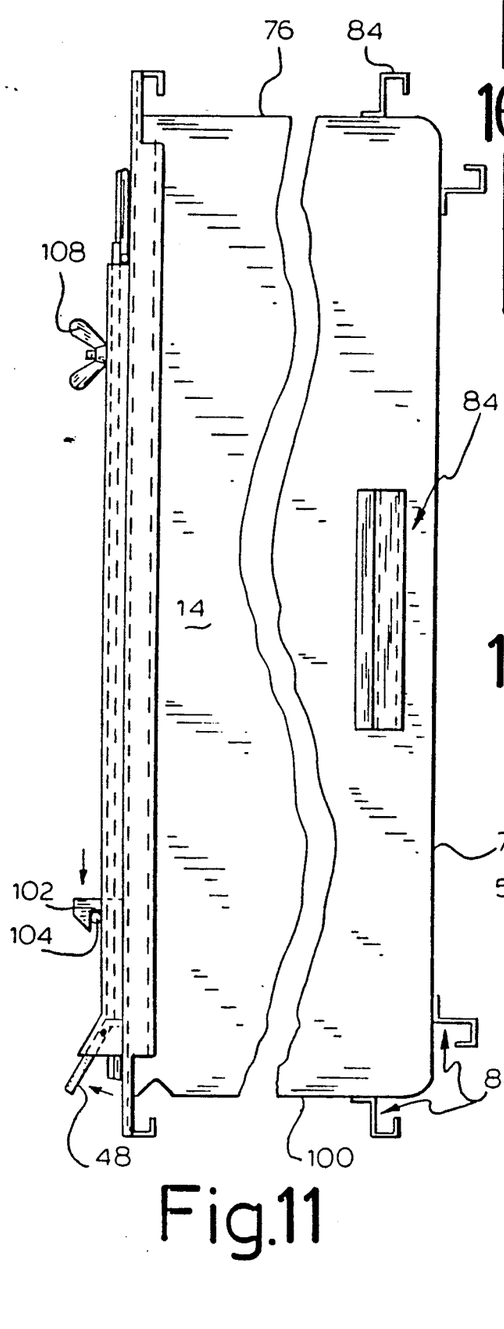
FIG. 11 is a broken, side elevational view, at an enlarged scale, of the cage, about perspective 11 of FIG. 9.

Cage 70, shown in FIGS. 9 to 11, is similar in many ways to the cages 10 previously shown in FIGS. 1 to 8, consisting of a flooring 72, a cage base 100 downwardly spaced from the flooring 72, two side walls 12, 14, a rear wall 74, an upper wall or cover 76, and a latticed gate 78 pivotally mounted to the front flange 12a of the side wall 12. However, there is provided a second embodiment of pivot member 80 for the gate 78, as well as a second embodiment of lock mounted at the level of the frontward flange 14a of the side wall 14, to retain the gate 78 therein. An alternate embodiment of the securing means for securing the cages to each other by brackets is also provided.

Figure 18:
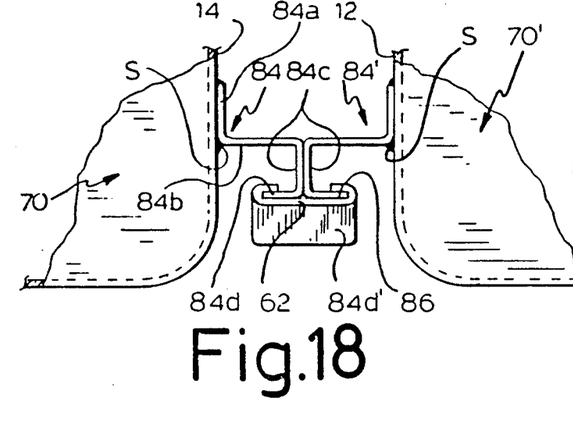
FIG. 18 is a plan view, at an enlarged scale, of area 18 of FIG. 10, showing a bracket securing together two cages.
Figure 19:
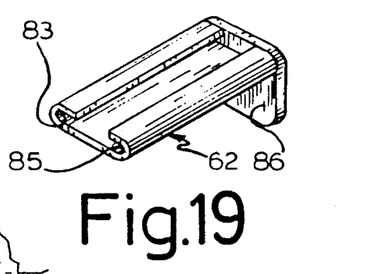
FIG. 19 shows a perspective view of the embodiment of bracket of FIG. 18.

As is shown in FIG. 11, each of the partitions 12, 14, 74, 76 and 100 comprises rails or hooks 84 outwardly projecting therefrom. The rails 84 of one side wall 12 or 14 of a first cage 70 are destined to abuttingly engage against the corresponding rails 84 of another side wall 14 or 12 from a second cage 70', proximate thereto, as is suggested in FIG. 18, and to be retained to each other in pairs thanks to a sliding bracket 62 (FIGS. 18-19).

Each rail 84 consists of an elongated plate (FIG. 11) longitudinally bent in three intermediate sections forming a leg 84a flatly welded in S to its supporting cage wall, two legs thereof 84b and 84c being of L-shape in edge view and projecting normal to this leg 84a on the opposite side thereof, and a leg 84d shorter than the others and dependent from the end of the leg 84c and extending toward the cage support partition but short of the latter. These legs 84c, 84c' of the two cages 70, 70' are destined to flatly abut against each other, so that the legs 84d, 84d' become coplanar.

The bracket 62, similar to the one of FIG. 3, consists of an elongated plate whose side edges are bent by 180° to constitute opposite cavities 83, 85 for guiding the legs 84d. Thus, the legs 84d, 84d' may engage in the cavities 83, 85 of the bracket 62, while sliding therein the bracket, so as to retain the two cages 70, 70' together. There may be added a stopper 86 to one end of the bracket 62, to prevent the bracket from being accidentally slidingly released when it engages the two legs 84d, 84d'. It is understood that the cages 70 may be releasably interconnected, not only by their side walls, but also by their rear walls, in the same way as for the flooring of a cage with the cover of another cage.

The gate 78 includes a series of vertically and horizontally spaced stems 88, 90 welded to each other with the vertical stems in an outwardly offset plane i.e. forwardly relative to the plane of the horizontal stems. The peripheral vertical stem 88a in register with the front edge 12a of the side wall 12 extends beyond the two opposite peripheral horizontal upper and lower stems 90a, 90b so as to constitute ears 92a, 92b. Bored plates 94, 96 transversely project from the upper and lower ends of the front flange 12a of the wall 12 and are anchored thereto, and are engaged by ears 92a, 92b so that the stem 88a may rotate thereabout, and thus that the gate may pivot thereabout to open or close.

Figures 13, 14, 15, 16, 17:
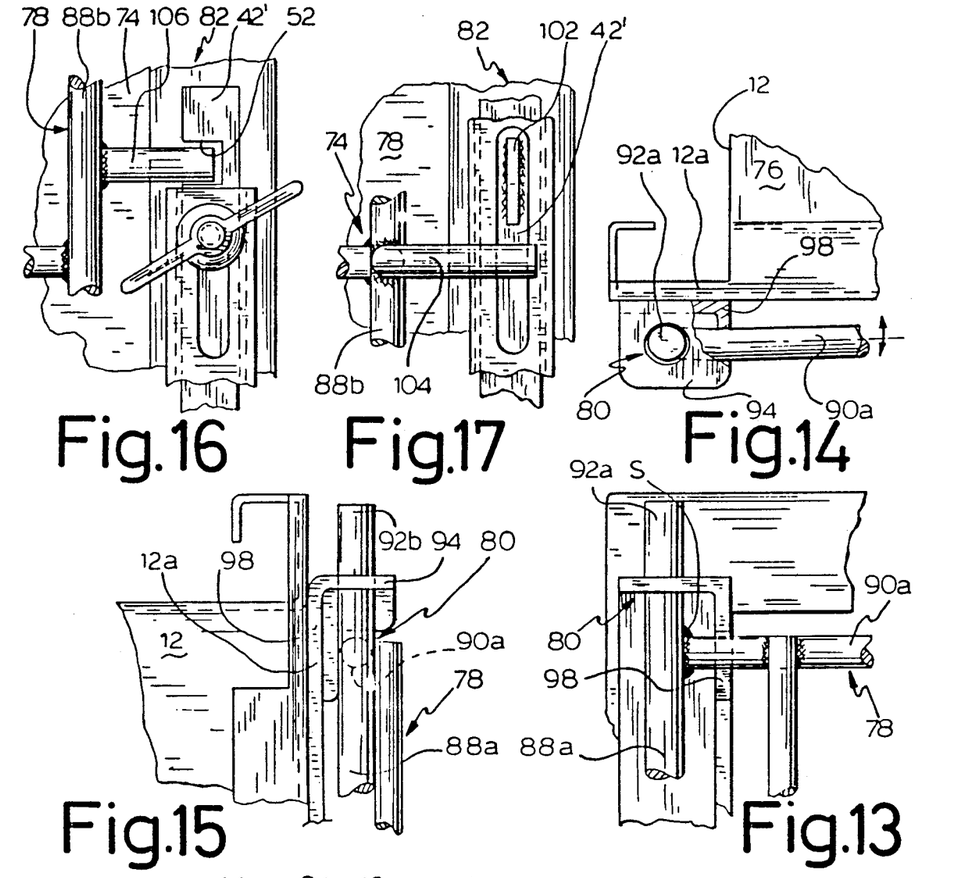
FIG. 13 is a view at an enlarged scale of the area 13 of FIG. 9.
FIG. 14 is a partially broken top plan view, at an enlarged scale, of the cage gate hinge.
FIG. 15 is a side elevational view of the upper section of the elements of FIG. 14.
FIGS. 16 and 17 are front elevational views of the upper and lower sections of the lock, about perspectives 16 and 17 of FIG. 12.

As is suggested in FIGS. 14-15, there is provided a seating block 98 projecting from the edge of cage 12a in register with the upper stem 90a, under the pivotal plate 94 and preferably integral to one side edge thereof. The thickness of this block 98 is such that, when the gate 78 is locked in closed position by the lock 82, a twisting moment will be exerted at the level of the stem 90a. This stem 90a must therefore be rigid, normally straight but resilient, being made e.g. from a metallic bar. Which is to say, by closing the gate 78, the seat 98 will induce an increasing torsional force on the stem 90a, as the gate is progressively closed and at least up to its fully closed position (FIG. 10). Indeed, as is shown in FIG. 14, the stem 90a will be temporarily bent when abutting against seat 98, since the plane interconnecting the vertical opposite peripheral stems 88a, 88b of the gate will then be interiorly (i..e nearer to the front edges 12a, 14a of the cage) of the front edge of the seat block 98. Therefore, the gate 78 when closed will be continuously biased in an open position. The elasticity of the stem 90a must allow it to return to its straight condition, when released from the block 98.

The inner peripheral stem 88a of the gate periphery will thus not come in register with the cage front opening. The other peripheral stems of the latticed gate 90a, 88b, 90b are on the other hand positioned in register with the periphery of the front aperture of the cage 70. Thus, a free slit remains, without vertical rods, between the lower horizontal stem 90b and the front flange of the flooring 72. To prevent various waste materials such as excrements of the caged animal from escaping the cage, it is envisioned that two vertical stems 88 extend downwardly beyond the flooring 72, but short of the base 100 of the cage, and that they horizontally interconnect at 88c.

Figure 12:
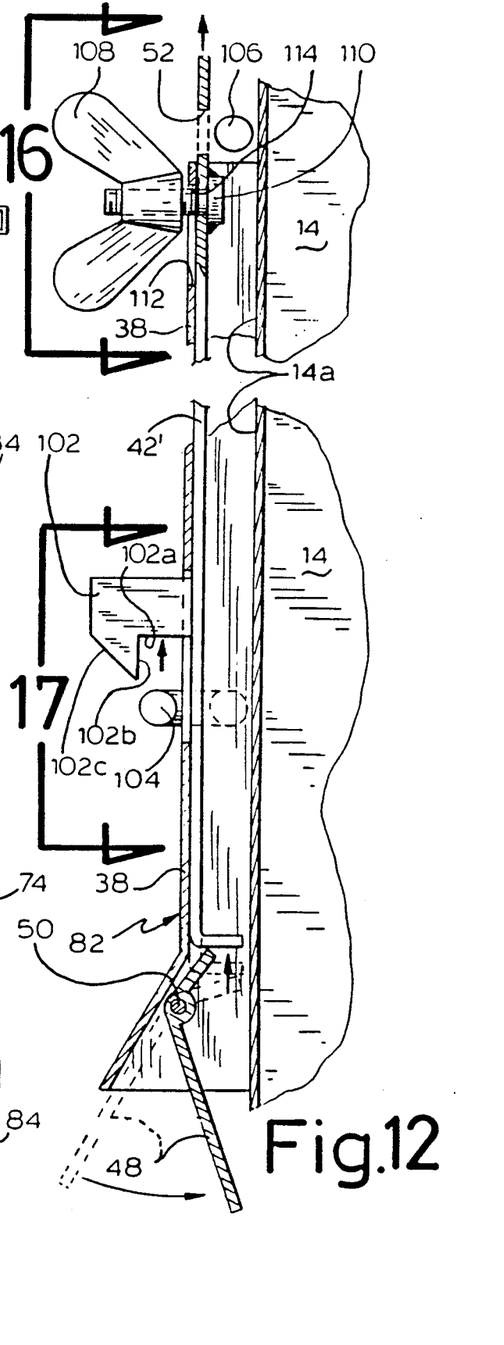
FIG. 12 is a broken, longitudinal sectional view, at an enlarged scale, taken along line 4—4 of FIG. 9.

The lock 82 is illustrated in FIGS. 11-12 and 16-17. It has basically the same principle as the embodiment of lock of FIG. 4a. However, a few modifications have been brought thereto. The latch 102 secured to the bar 42' which is vertically slidable in the casing 38 anchored to the edge 14a, now comprises a lower cavity which is not curved but rather forming a right-angle seat, including a horizontal face 102a and a vertical face 102b. Moreover, the frontward outer edge of the latch 102 is in convex but rather downwardly-inwardly bevelled, at 102c. The stem engaged by the latch 102 when the gate 78 is closed, is now an elbowed stem 104, projecting from the vertical stem 88b outwardly from the gate plane, as is clearly shown at the bottom of FIG. 11. The face 102c facilitates the lifting of the latch 102 when the arm 104 of the gate 78 abuts thereagainst when the latter is forcibly swung in closed position. On the other hand, the arm 106, destined to extend through the aperture 52 of the casing 38 when the gate 78 closes, outwardly projects from the vertical stem 88b in the plane of stems 88, as is shown in FIG. 12.

Finally, rather than using a padlock to lock the latch to the gate, there is provided frictional lock means for the slider 42' (from which depends the latch 102), including an outer winged nut 108 and a bolt 110. The bolt 110 extends through the slider 42' through a threaded bore 114, forwardly and head-first, and freely through a slit 112 made in the casing 38. The slit 112 is sufficiently elongated (vertically) so as not to obstruct the (vertical) sliding motion of the stick 42'. The nut 108 is screwed to the bolt. By screwing the nut 108, the slider 42' is frictionally locked against the (fixed) casing 38, thus preventing operation of the control lever 49, and therefore locking the door lock in its closed condition.

I claim:

1. The combination of a vertical open frame defining two opposite vertical sides and two upper and lower edges, a pivot member mounted on one of said sides, a gate consisting a spaced horizontal and vertical stems and carried by the frame in a vertical plane by said pivotal member which enables its pivotal motion about a vertical axis between a closed position and an open position, and a lock mounted on the other of said sides for releasably retaining the gate in closed position i.e. substantially coplanar to said frame; wherein said lock comprises: retaining means about said other side of the frame, a stick slidably mounted to said other side of the frame thanks to said retaining means between two upper and lower limit positions, a grabbing member being secured to said stick and capable of grabbing one of said horizontal stems of the gate once the latter is closed, said grabbing member being actuated by the vertical sliding of said stick, and control means for sliding said stick and thus actuating said grabbing member, and wherein said control means may be actuated by coarse means such as with the elbow or the knee; wherein said grabbing member is a latch defined by a plate, with a rounded cavity on its lower face, said one of said horizontal stems releasably engaging said rounded cavity under the weight of said stick when said gate is in closed position in order to retain said gate in closed position; and wherein an inner curved face of said latch is downwardly outwardly curved relative to the adjacent side of the frame, so that, once the gate has been brought to its closed position after having pivoted from its open position to its closed position, the latch, striking said inner curved face of said one of said horizontal stems will lift under impact and will subsequently come to engage on said one horizontal stem under the weight of said stick.

2. A gate frame combination as defined in claim 1, wherein said gate lock further includes: another cavity, made in the upper section of said stick, a second horizontal stem destined to register with said another cavity when said stick is at said upper limit position and to extend through said cavity, so as to permit the opening or the closure of the gate concurrently with the motion of said latch.

3. A gate frame combination as defined in claim 2, wherein the two legs of said lever define therebetween an obtuse angle of between 110° and 140°.

4. A gate frame combination as defined in claim 1, wherein said control means includes a lever, pivotally mounted at its intermediate section to the base of said frame; said lever comprising two legs the upper one of which will slide under said stick to lift same when the lever is pivoted, and the lower one of which downwardly forwardly projects when the stick is at said lower limit position but downwardly and rearwardly when the stick is at its upper limit position.

5. A gate frame combination as defined in claim 4, wherein said frame is the front wall of a small animal cage, said retaining means is a tubular member secured in vertical position on said other side of the frame and into which said stick may slide, the upper section of said stick projecting beyond said tubular member when the stick is in its said upper limit position, an aperture being made in the inner wall of said tubular member to receive said latch and to enable its vertical play once the stick is sliding.

6. A cage as defined in claim 5, wherein said sides of said frame each comprises a flange respectively outwardly, rearwardly and inwardly elbowed three times at right angle; several such cages being positioned side by side as well as superimposed one over the others; a rigid, elongated, cross-sectionally flattened C-shape connector vertically joining the free rearward section of said elbowed flange of the superimposed pairs of transversely adjacent frames, to releasably interconnect said cages.

7. An assembly of cages as defined in claim 6, further including stick guiding means for facilitating the sliding motion of the stick within said tubular member.

8. The combination of a frame defining a large aperture, a first frame section comprising a pivotal member, a gate being carried by the frame through said pivotal member which enables its pivotal motion between a closed position, within a plane slightly outwardly of and parallel to said aperture, and an open position clearing said aperture, and a gate lock mounted to a second section of said frame opposite said first section thereof to releasably retain the gate in closed position; wherein said lock comprises: gate retaining means about said second frame section, a stick mounted substantially vertically slidable on said second frame section via said retaining means between two upper and lower limit positions, a grabbing member being secured to said stick, and serving to grab and to maintain said gate in a closed condition under the bias of the weight of the stick once the gate is in closed position, said grabbing member being actuated by the downward sliding of said stick, and control means for opening the gate by lifting said stick and thus by disengaging said grabbing member, and wherein said control means may be actuated by a person without having to use his hands; wherein said combination constitutes a cage for small animals; a plurality of such cages being provided, whose side walls, rear wall, flooring and cover comprise a pair of rails that outwardly project from the cage; said other cages adapted to be positioned on the sides, the top, the underface and the rear of the first-mentioned cage so that said pair of rails of two adjacent cages come in respective register; and further comprising brackets, each able to slidingly and releasably interconnect one said pair of rails, so as to constitute a wall assembly of interconnected cages.

9. A cage for small animals, comprising:
(a) a flooring supporting two side walls and a rear wall, and a cover integral to the side and rear walls;

(b) a large front aperture being defined between front edges of said side walls, of the flooring and of the cover;

(c) a gate pivotally mounted to the front edge of a first side wall by a pivotal member enabling gate pivotal motion about an axis parallel to but forwardly of the plane of said aperture;

(d) a hook member, mounted to said gate at an opposite end of said pivotal member;

(e) a gate lock, mounted to the front edge of the second side wall and adapted to grab said hook member when the gate becomes substantially parallel to said aperture;

(f) simplified lock control means, for enabling a person to unlock the lock without having to use his hands; and (g) biasing means, to bias the closed gate to open once the gate lock is unlocked; wherein said pivotal member includes two spaced plates transversely integral to the front edge of said first side wall, these plates being bores so as to pivotally receive a first stem substantially vertical and integral to the gate said biasing means comprising a spacer block, projecting from said front edge of said first side wall, between the plates, and defining a front face of a seat, and a second normally straight stem substantially horizontal and integral to the door and destined to register with said spacer block, said second stem being rigid but resilient so as to return to its straight condition following bending force thereon, the thickness of said spacer block being such that a twisting moment at the level of said second stem is induced by the abutment of said seat against an inner section of said second stem, when the gate nears its closed position and this twisting moment increases at least up to the time when the door or gate becomes parallel to the plane of said cage aperture.

10. A cage as defined in claim 9, wherein said gate lock comprises an elongated casing, anchored in vertical position to the front edge of said second side wall, a stick slidable in said casing between two limit positions, and a latch, transversely mounted on said stick and extending through a slit in said casing and destined to engage said hook member under the bias of the weight of the stick when the gate is parallel to said cage aperture; said stick being sensitive to said gate lock control means which is able to lift same.

11. A cage as defined in claim 10, further including releasable frictional lock means for frictionally locking said stick to said casing, said means destined to temporarily disengage said gate lock control means.

12. A cage as defined in claim 10, wherein said hook member is an elbowed cross-sectionally circular arm, integral to the gate and forwardly projecting from its plane, said latch comprising a lower face defining: an upper and inner horizontal wall, a flat outer wall which is upwardly forwardly bevelled, and a vertical wall between the two first-mentioned walls; said latch facilitating the automatic engagement of said gate lock to close the gate, simply by forcibly pivoting the gate towards its closed position, under the impact of said elbowed arm against said bevelled latch wall to lift said stick, as well as the subsequent locking of said cross-sectionally circular elbowed arm between said horizontal and vertical walls of the latch and the section in register with said casing.

13. A cage as defined in claim 9, in combination with other cages identical to the first-mentioned cage, whose side walls, rear wall, flooring and cover comprises rails that outwardly project from the cage; said other cages being destined to be positioned on the sides, the top, the underface and the rear of the first-mentioned cage so that the pair of rails of two adjacent cages come in respective register; and further comprising brackets, each able to slidingly and releasably interconnect one said pair of rails, so as to constitute a wall assembly of interconnected cages.

* * * * *